(12) United States Patent
Wright

(10) Patent No.: US 6,612,329 B2
(45) Date of Patent: Sep. 2, 2003

(54) LOCKING VALVE STEM AND CAP APPARATUS

(76) Inventor: Scott T. Wright, 2308 Sunnybrook Dr., Apt. 304, Nampa, ID (US) 83686

( * ) Notice: Subject to any disclaimer, the term of this patent is extended or adjusted under 35 U.S.C. 154(b) by 83 days.

(21) Appl. No.: 09/990,810

(22) Filed: Nov. 16, 2001

(65) Prior Publication Data

US 2003/0094198 A1 May 22, 2003

(51) Int. Cl.$^7$ .......................... F16K 15/20; B60C 29/06
(52) U.S. Cl. ........................ 137/232; 138/89.4; 152/428
(58) Field of Search ........................... 137/232; 138/89, 138/89.1, 89.2, 89.3, 89.4; 152/428, 431

(56) References Cited

U.S. PATENT DOCUMENTS

| | | | | |
|---|---|---|---|---|
| 1,034,209 A | * | 7/1912 | Currin | 138/89.4 |
| 1,123,157 A | * | 12/1914 | Aiken | 138/89.4 |
| 1,270,253 A | * | 6/1918 | Aker | 138/89.4 |
| 1,328,488 A | * | 1/1920 | Bowden | 138/89.4 |
| 1,328,801 A | * | 1/1920 | Bowden | 138/89.4 |
| 1,370,474 A | * | 3/1921 | Newsom | 138/89.4 |
| 1,397,235 A | * | 11/1921 | Sabel | 138/89.4 |
| 1,423,515 A | * | 7/1922 | Catterall | 138/89.4 |
| 1,423,541 A | * | 7/1922 | Rockwell | 138/89.4 |
| 1,478,055 A | * | 12/1923 | Parker | 138/89.4 |
| 1,482,947 A | * | 2/1924 | Shorts | 137/227 |
| 1,578,961 A | * | 3/1926 | Downs | 137/232 |
| 2,057,590 A | * | 10/1936 | Rader | 138/89.2 |
| 2,677,388 A | * | 5/1954 | Neff | 137/232 |
| 3,728,848 A | * | 4/1973 | Vest, Jr. | 138/89.2 |
| 3,910,221 A | | 10/1975 | Aske et al. | |
| 4,239,184 A | | 12/1980 | Dudar | |
| 5,161,056 A | | 11/1992 | Sitter | |
| 5,597,010 A | | 1/1997 | Hoffman et al. | |
| 5,791,371 A | | 8/1998 | Kemp, II | |
| 6,062,787 A | | 5/2000 | Maddalena | |
| 6,119,714 A | | 9/2000 | Otzen | |
| 6,176,255 B1 | | 1/2001 | Robinson | |

* cited by examiner

Primary Examiner—John Rivell
(74) Attorney, Agent, or Firm—Dale J. Ream

(57) ABSTRACT

A valve stem and cap apparatus includes a valve stem having a base for attachment to a rim and a tubular sleeve extending upwardly from the base, the sleeve defining an open end. A stem valve is positioned in the sleeve for regulating air flow therethrough. A pair of resilient flanges are positioned on an outer surface of the sleeve adjacent the open end. The apparatus includes a cap having a cylindrical configuration with an open end for selectively covering the open end of the sleeve. The cap defines a pair of oppositely disposed apertures for releasably engaging respective resilient flanges in a snap-fit relationship when the cap is positioned to cover the open end of the sleeve and appropriately rotated.

15 Claims, 5 Drawing Sheets

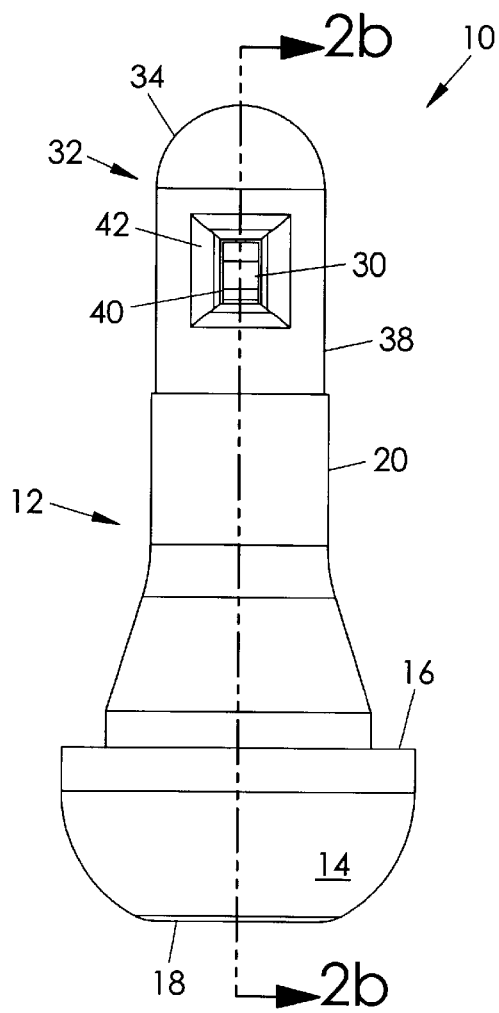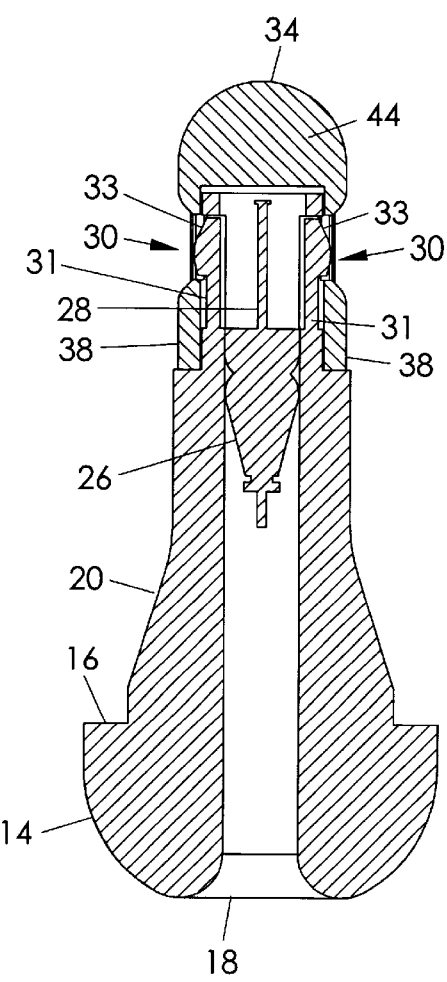
FIG. 2a
FIG. 2b

LOCKING VALVE STEM AND CAP APPARATUS

BACKGROUND OF THE INVENTION

This invention relates generally to valve stems and covers for pneumatic tires and, more particularly, to a valve stem and cap apparatus in which resilient flanges on a valve stem releasably engage corresponding apertures defined by a cap.

Exposed valve stems on inflatable tires or valve stems having covers that are easily removable are desirable targets for vandals and pranksters seeking to deflate the tires. Conventional valve stem covers are threadably coupled to corresponding valve stems and can so be easily removed even at night. Although various valve stem caps are lockable on a valve stem using a special tool or key, these devices do not provide a valve stem and cap apparatus that is sufficiently difficult to remove so as to frustrate would-be vandals yet simple enough for a user to remove without a tool or key.

Therefore, it is desirable to have a locking valve stem and cap apparatus that may not be threadably removed and which does not require a key or tool to be removed. Further, it is desirable to have a locking valve stem and cap apparatus in which a cap is releasably secured to a valve stem sleeve in a rotational snap-fit relationship.

SUMMARY OF THE INVENTION

A valve stem and cap apparatus according to the present invention includes a valve stem having a base and a tubular sleeve. The base is configured for attachment to the rim of an inflatable tire and the sleeve extends upwardly from the base. A conventional stem valve is positioned within the sleeve for regulating airflow through the sleeve and into or out of the inflatable tire. A pair of resilient flanges are positioned along the sleeve adjacent an open end thereof. The apparatus includes a cap defining a pair of apertures. The cap is sized to slide down over the valve stem sleeve so as to cover the open end of the sleeve. Respective resilient flanges and cap apertures mate with one another in a snap-fit relationship when the cap is sufficiently pushed onto the sleeve and the cap is appropriately rotationally positioned thereon. Further, the cap may be removed by depressing the resilient flanges and rotating the cap so as to release the snap-fit engagement.

Therefore, a general object of this invention is to provide a valve stem and cap apparatus that deters unauthorized removal of the valve stem cap.

Another object of this invention is to provide a valve stem and cap apparatus, as aforesaid, which precludes unintended or accidental removal of the valve cap.

Still another object of this invention is to provide a valve stem and cap apparatus, as aforesaid, in which the cap is snappably secured to the valve stem using a spring-loaded tab configuration.

Yet another object of this invention is to provide a valve stem and cap apparatus, as aforesaid, which is economical to manufacture and easy to use.

A further object of this invention is to provide a valve stem and cap apparatus, as aforesaid, which does not require the use of a tool or key.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 2a is a front view of the apparatus as in FIG. 1;

FIG. 2b is a sectional view taken along line 2b—2b of FIG. 2a;

FIG. 3b is a sectional view taken along line 3b—3b of FIG. 3a;

FIG. 5b is a sectional view taken along line 5b—5b of FIG. 5a.

DESCRIPTION OF THE PREFERRED EMBODIMENT

Figure 1:
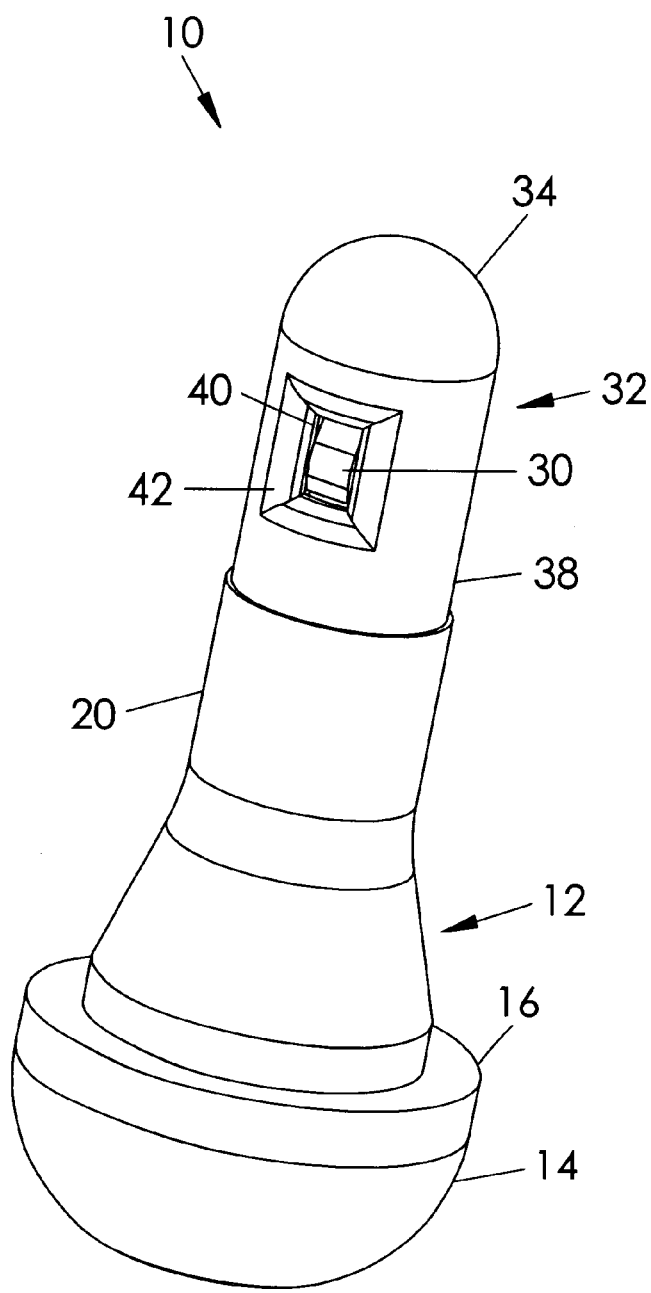
FIG. 1 is a perspective view of a valve stem and cap apparatus according to one embodiment of the present invention.

A locking valve stem and cap apparatus according to the present invention will now be described in detail with reference to FIGS. 1–5b of the accompanying drawings. A valve stem and cap apparatus 10 according to one embodiment includes a valve stem 12 having a base 14 and a tubular sleeve 20 extending upwardly from the base 14. The base 14 includes a conventional construction that is generally hemispherical with an upper ledge 16 that is suitable for a friction-fit engagement with the rim of an inflatable tire. The base 14 defines an open bottom (FIG. 2b) such that air may be conveyed therethrough into or out of an inflatable tire. The tubular sleeve 20 defines an open top 22 oppositely disposed from the open bottom 18 of the base 14 (FIGS. 2b and 3b).

Figure 3A:
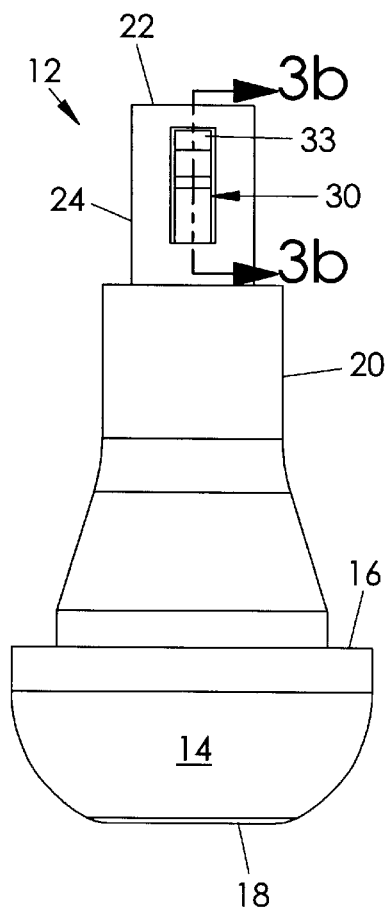
FIG. 3a is a front view of the apparatus as in FIG. 2a with the cap removed.
Figure 3B:
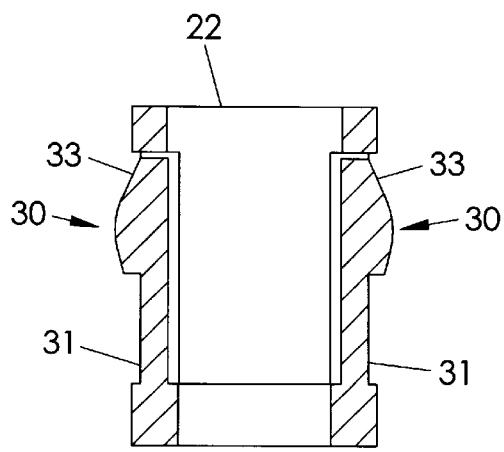

Although the sleeve 20 includes an inner diameter that is longitudinally uniform (FIG. 2b), the sleeve 20 includes an cap receiving portion 24 adjacent its open top 22 that defines an outer diameter that is less than an outer diameter of the remainder of the sleeve 20 (FIG. 3a). The cap receiving portion 24 is configured to receive a cap thereon, as will be described in more detail below. A stem valve 26 is threadably mounted within the tubular sleeve 20 in a conventional manner adjacent the open top 22 (FIG. 2b). A valve shaft 28 extends upwardly from the stem valve 26 toward the open top 22. The stem valve 26 is normally biased toward the open top 22 by the pressure of air within the inflatable tire so as to seal the air therein. A depression of the valve shaft 28, however, causes the stem valve 26 to move threadably into the sleeve 20 so as to release air from the inflatable tire into the ambient air.

A pair of resilient flanges 30 are fixedly attached to an outer wall of the cap receiving portion 24 of the sleeve 20 substantially adjacent the open top 22. It is understood that a single flange or multiple flanges would also be suitable. Preferably, each flange 30 is in the form of a tab having a first end 31 fixedly attached to the outer wall and having a convex free end 33 (FIG. 3b). Each flange 30 may be constructed of a flexible plastic material although a spring steel construction would also be suitable.

Figure 4:
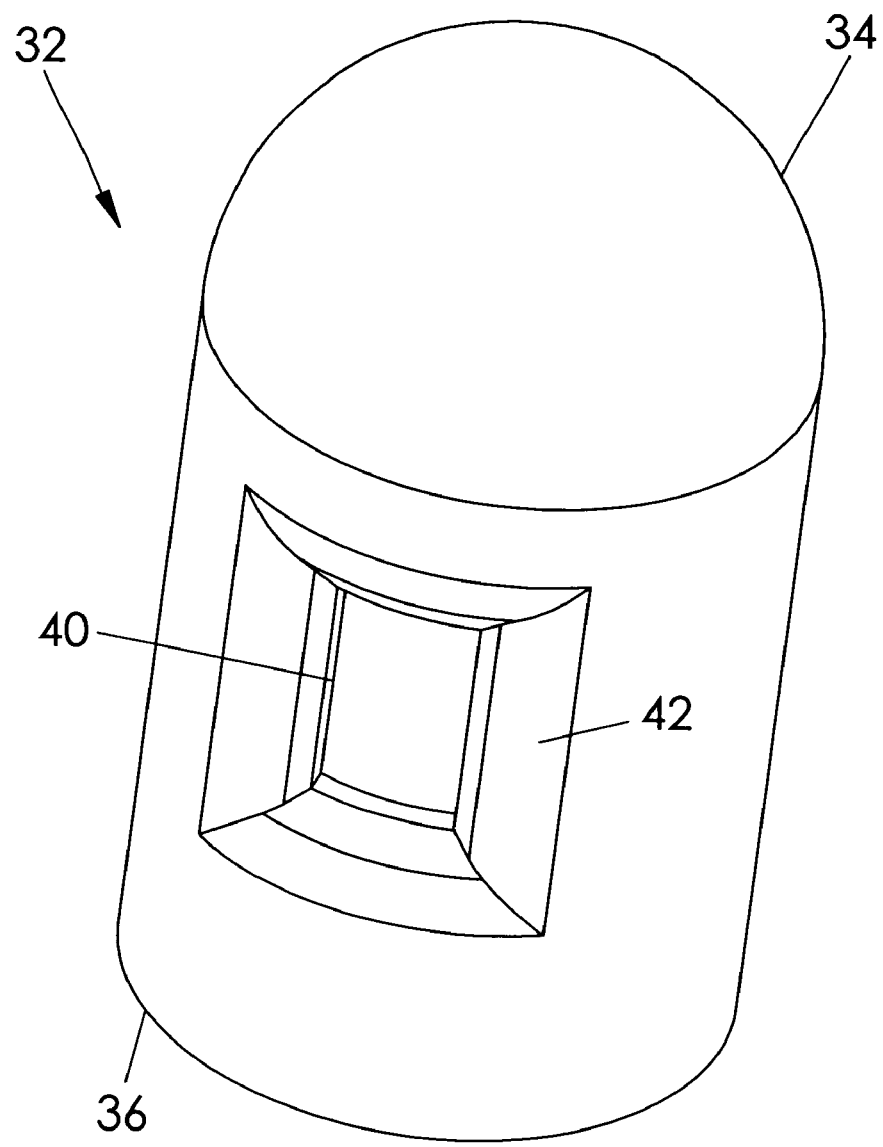
FIG. 4 is a perspective view on an enlarged scale of the cap of the apparatus as in FIG. 1.

The valve stem and cap apparatus 10 further includes a cap 32 having a generally cylindrical configuration (FIG. 4). The cap 32 includes a closed end 34 having a dome-shaped configuration and defines an open end 36 opposite the closed end 34. A side wall 38 defining an interior space extends between the open 36 and closed 34 ends. The side wall 38 presents a smooth, unthreaded interior surface. The side wall 38 preferably defines a pair of oppositely disposed apertures 40, although a single aperture or a plurality of apertures would also be suitable. The outer surface of the side wall 38 includes a plurality of inwardly beveled edges 42 about each aperture 40 to enhance reception an authorized user's finger into the aperture 40 whereby to release the cap 32 from the sleeve 20, as to be described below. A solid filler material 44 is fixedly mounted within the dome-shaped closed end 34. The filler material 44 presents a thickness such that respective apertures 40 and flanges 30 are vertically aligned when the cap 32 is completely mounted atop the sleeve 20.

In use, the valve stem 12 may be installed on the rim of an inflatable tire in a conventional manner. Further, the stem valve 26 and valve shaft 28 may be used conventionally to add or release air into the inflatable tire. To cover the valve stem 12, the cap 32 may be lowered open end first onto the cap receiving portion 24 of the tubular sleeve 20. As the cap 32 is pressed thereon, the outwardly biased flanges 30 are depressed. Once the filler material 44 within the cap 32 bears against the free edge of the cap receiving portion 24, the cap 32 may be rotated until the apertures 40 register with respective flanges 30 and the flanges spring back to their normally outwardly biased configuration. Thus, the cap 32 is releasably locked to the valve stem 12. The cap 32 may be released by depressing the flanges 30 through the apertures 40 and lifting the cap 32 off the sleeve 20.

Figure 5A:
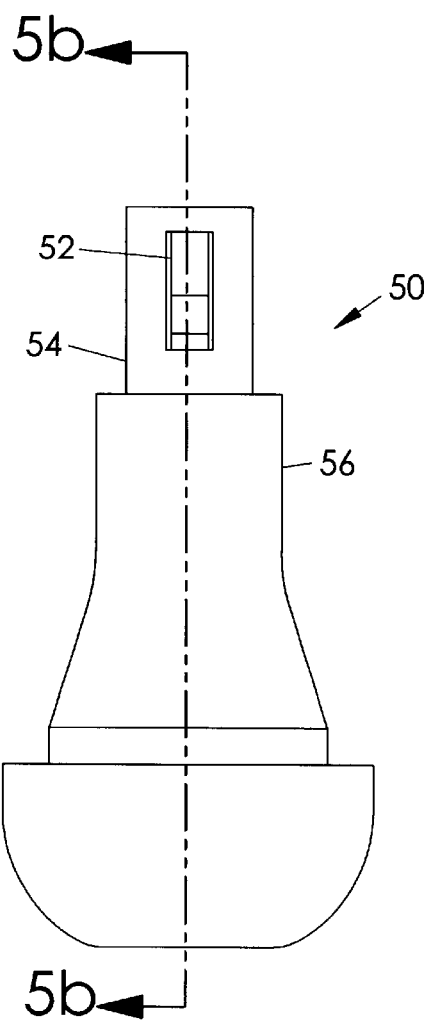
FIG. 5a is a front view of a valve stem and cap apparatus according to another embodiment of the present invention.
Figure 5B:
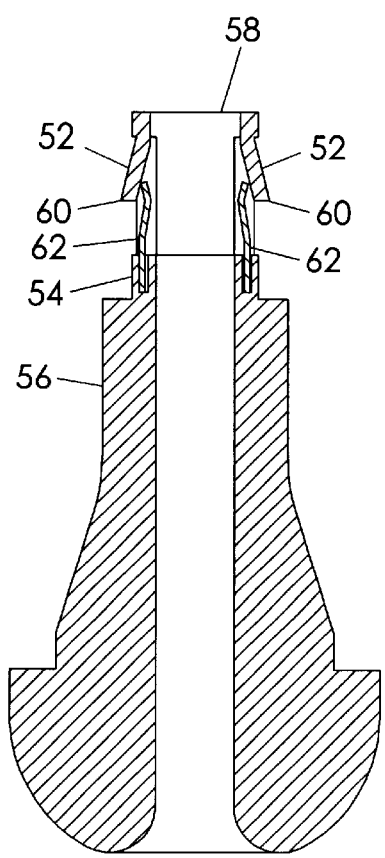

Another embodiment of a valve stem and cap apparatus 50 shown in FIGS. 5a and 5b and is substantially similar in construction to the embodiment 10 described above except as specifically noted below. In this embodiment, each resilient flange 52 includes one end fixedly attached to the cap receiving portion 54 of the sleeve 56 adjacent the open top 58 and extends downwardly to a free end 60. A metal spring 62 or spring clip is positioned behind the flange 52 such that the flange 52 is normally biased outwardly. The resilient flange 52 is adapted for releasable locking engagement with the cap apertures as described above.

Having thus described the invention, what is claimed as new and desired to be secured by letters patent is as follows:

1. A locking valve stem and cap apparatus for use with an inflatable tire, comprising:
   a valve stem having a base and a tubular sleeve extending upwardly from said base, said sleeve defining an open end;
   a stem valve in said sleeve for selectively regulating passage of an air stream into or out of the inflatable tire;
   at least one resilient flange connected to said sleeve adjacent said open end; and
   a cap for selectively covering said open end of said sleeve, said cap defining at least one aperture for releasably mating with a respective resilient flange.

2. The locking valve stem and cap apparatus as in claim 1 wherein said stem valve is threadably mounted in said sleeve and includes a valve shaft extending toward said open end, said stem valve being normally biased toward said open end of said sleeve by the pressure of air within the inflatable tire so as to seal said air within the inflatable tire and said stem valve being selectably movable in said sleeve so as to release said air from the inflatable tire when said valve shaft is depressed.

3. The locking valve stem and cap apparatus as in claim 1 wherein said cap comprises:
   a closed end having a dome-shaped configuration;
   an open end opposite said closed end; and
   a side wall extending between said open and closed ends and having a generally cylindrical configuration, said side wall defining said at least one aperture.

4. The locking valve stem and cap apparatus as in claim 3 wherein said closed end includes a solid filler material therein having a thickness such that said respective apertures and resilient flanges register with one another when said cap is positioned to cover said open end of said sleeve.

5. The locking valve stem and cap apparatus as in claim 1 wherein said cap includes an outer surface that defines a plurality of beveled edges surrounding said at least one aperture, whereby a user may comfortably depress said at least one resilient flange through said at least one aperture to release said cap from said valve stem.

6. The locking valve stem and cap apparatus as in claim 1 wherein each resilient flange is a tab having a flexible plastic construction.

7. The locking valve stem and cap apparatus as in claim 1 wherein each resilient flange is a tab having a spring steel construction.

8. The locking valve stem and cap apparatus as in claim 1 wherein each resilient flange is a tab having a spring adjacent a back side thereof which biases said resilient flange in an outwardly direction.

9. A locking valve stem and cap apparatus for use with an inflatable tire, comprising:
   a valve stem having a base adapted to be attached to a rim of the inflatable tire in a sealed relationship, said valve stem having a tubular sleeve extending upwardly from said base and defining an open end opposite said base;
   a stem valve threadably mounted within said sleeve and having a valve shaft extending toward said open end, said stem valve being normally biased toward said open end by the pressure of air within the inflatable tire so as to seal said air within the inflatable tire, said stem valve being selectively movable into said sleeve when said valve shaft is depressed so as to release said air from the inflatable tire;
   a pair of resilient flanges oppositely disposed on an outer surface of said sleeve adjacent said open end thereof;
   a cap for selectively covering said open end of said sleeve, said cap comprising:
   a closed end having a dome shaped configuration;
   an open end opposite said closed end; and
   a side wall extending between said open and closed ends of said cap, said side wall defining a pair of oppositely disposed apertures for releasably mating with said pair of resilient flanges.

10. The locking valve stem and cap apparatus as in claim 9, wherein said cap includes a solid filler material in said closed end, said filler material having a thickness such that respective pairs of apertures and resilient flanges register with one another when said cap is positioned to cover said open end of said sleeve.

11. The locking valve stem and cap apparatus as in claim 9 wherein said cap includes a smooth, unthreaded inner surface.

12. The locking valve stem and cap apparatus as in claim 9 wherein said cap includes an outer surface that defines a plurality of beveled edges surrounding respective apertures, whereby a user may comfortably depress respective resilient flanges through said respective apertures to release said cap from said valve stem.

13. The locking valve stem and cap apparatus as in claim 9 wherein each resilient flange is a tab having a flexible plastic construction, each resilient flange having a first end fixedly attached to said sleeve and an opposed free end.

14. The locking valve stem and cap apparatus as in claim 9 wherein each resilient flange is a tab having a spring steel construction, each resilient flange having a first end fixedly attached to said sleeve and an opposed free end.

15. The locking valve stem and cap apparatus as in claim 9 wherein each resilient flange is a tab having a spring adjacent a back side thereof which biases said resilient flange in an outwardly direction.

* * * * *